United States Patent [19]

Fuzita

[11] 4,335,856

[45] Jun. 22, 1982

[54] COIL WINDING MACHINE

[75] Inventor: Yasuhiro Fuzita, Yokosuka, Japan

[73] Assignee: Hitachi, Ltd., Tokyo, Japan

[21] Appl. No.: 140,961

[22] Filed: Apr. 17, 1980

[30] Foreign Application Priority Data

Apr. 20, 1979 [JP] Japan .................................. 54/47965

[51] Int. Cl.³ ........................................... H02K 15/04
[52] U.S. Cl. ............................. 242/7.05 B; 140/92.1; 242/7.14
[58] Field of Search ...................... 242/7.05 B, 7.05 R, 242/7.14, 82; 140/92.1; 29/598, 33 L, 732

[56] References Cited

U.S. PATENT DOCUMENTS

| | | | |
|---|---|---|---|
| 3,006,564 | 10/1961 | Hambleton | 242/7.05 B |
| 3,098,616 | 7/1963 | Eminger | 242/7.05 B |
| 3,106,351 | 10/1963 | Fulton | 242/7.14 |
| 3,361,371 | 1/1968 | Dickensheets et al. | 242/7.05 B |

Primary Examiner—Billy S. Taylor
Attorney, Agent, or Firm—Craig and Antonelli

[57] ABSTRACT

A coil winding machine for winding coils around the smooth core of a smooth core armature in which the wire extracted from a rotating flyer is wound and arrayed on the smooth core to form coils uniformly and in good order. The coil winding machine has a pair of wire guides each having a guide surface for guiding the wire extracted from the flyer to the winding position on the smooth core in order to wind the wire regularly and uniformly on the smooth core in good order. The wire guides are disposed between the spindle and the smooth core, in parallel with the smooth core and to diametrically oppose to each other, in such a manner as to be able to slide in the radial direction of the spindle. The wire guides are moved, in synchronism with the rotation of the flyer, along the outer peripheral surface of the smooth core or along the surface of the coil wound around the latter, so that successive layers of coil are formed following up the position of the preceding coil to thereby form a coil uniformly and in good order.

4 Claims, 4 Drawing Figures

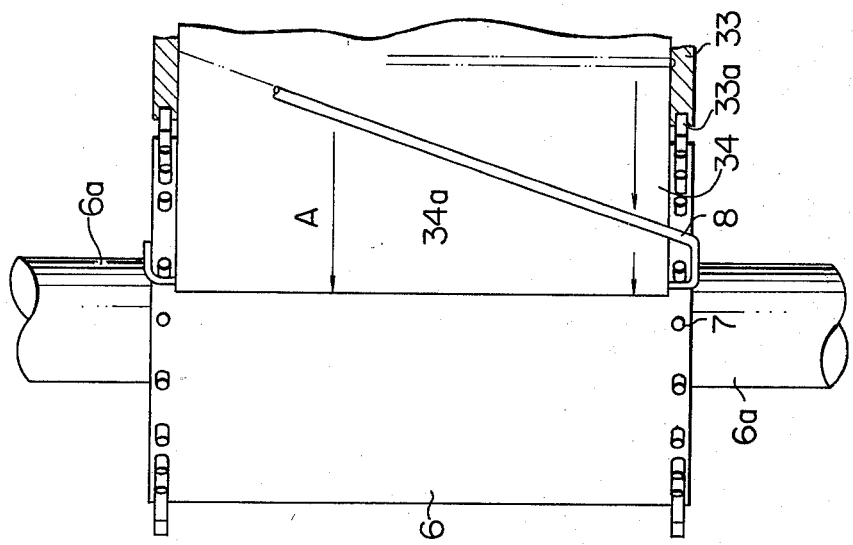
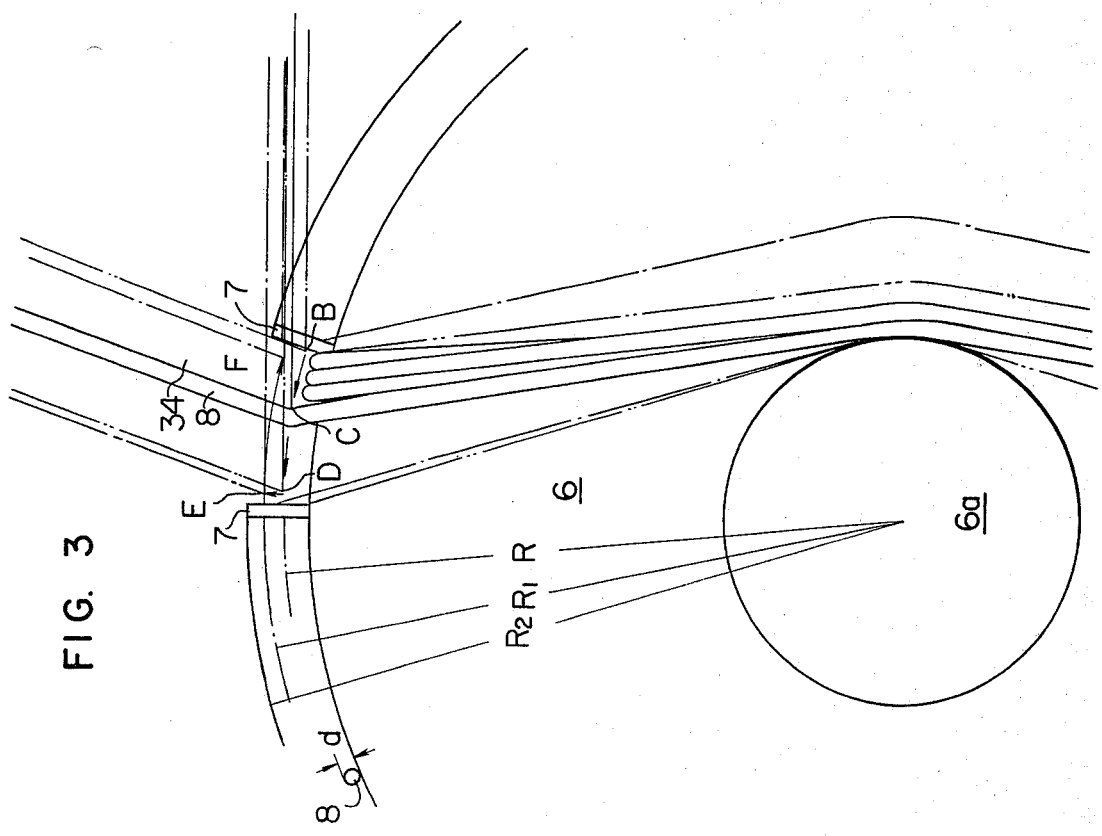

COIL WINDING MACHINE

BACKGROUND OF THE INVENTION

1. Field of the Invention

The present invention relates to a coil winding apparatus for winding coils around an armature of an electric motor or the like and, more particularly, to a coil winding machine suitable for use in winding coils around the core of a smooth core armature having no peripheral slots for receiving the coil.

2. Description of the Prior Art

Hitherto, the coil winding for a smooth core armature which simply has a columnar or cylindrical form has been accomplished by beforehand forming coils of predetermined shapes, arraying these coils on the outer peripheral surface of the smooth core of the armature of bonding and fixing the coils to the core by means of glass tapes or the like.

Therefore, the coils are liable to be disordered during shifting to the core of the smooth core armature, even if they are formed uniformly and in good order, resulting in a reduced space further. It is not possible to improve the performance of an electric motor with such a smooth core armature as having a small space factor.

In addition, the productivity is extremely low and requires a great deal of skill partly because the formation of coils and attaching of coils have to be made in separate steps, and partly because the work has to be done while paying specific attention to avoid the disordering of the coil.

SUMMARY OF THE INVENTION

It is, therefore, an object of the invention to provide a coil winding machine for a smooth core armature, capable of winding coils uniformly in good order directly around the core of a smooth core armature.

To this end, according to the invention, there is provided a coil winding machine comprising a wire guide disposed between the outer peripheral surface of the core of a smooth core armature and a flyer for winding a wire around the core, the wire guide being adapted to move on a circle concentric with the core keeping a predetermined space between itself and the outer peripheral surface of the core. The wire guide is moved, during operation of the coil winding machine, in synchronism with the rotation of the flyer to limit the winding position of the wire extracted from the flyer to wind the wire regularly on the outer peripheral surface of the core to directly form the coils uniformly and in good order.

BRIEF DESCRIPTION OF THE DRAWINGS

FIG. 3 is an illustration of operation of a wire guide incorporated in the coil winding machine shown in FIG. 2; and FIG. 4 is a plan view of the wire guide shown in FIG. 3.

DESCRIPTION OF THE PREFERRED EMBODIMENTS

A preferred embodiment of the invention will be described hereinunder with reference to the accompanying drawings.

A coil winding machine of the invention has a pair of wire guides disposed at both sides of the core of a smooth core armature (referred to simply as "core" hereinafter) in such a manner that the ends of these wire guides are diametrically oppose to each other. These wire guides have guide surfaces parallel to the outer peripheral surface of the core and are disposed between pins provided on both ends of the core.

During the operation of the coil winding machine, the wire guides are moved, in synchronization with the revolution of a flyer for winding coils around the core, along a circle concentric with the core, while keeping a clearance at least equal to the diameter of the wire, between itself and the outer peripheral surface of the core. As a result, the wire extracted from the flyer is slid along the guide surfaces of the wire guides and dropped from the ends of the latter onto the outer peripheral surface of the core. As a result, the winding position at which the wire is wound round the core is strictly limited and the wire is arrayed and wound on the outer peripheral surface of the core to form uniform coils in good order.

Figure 1:
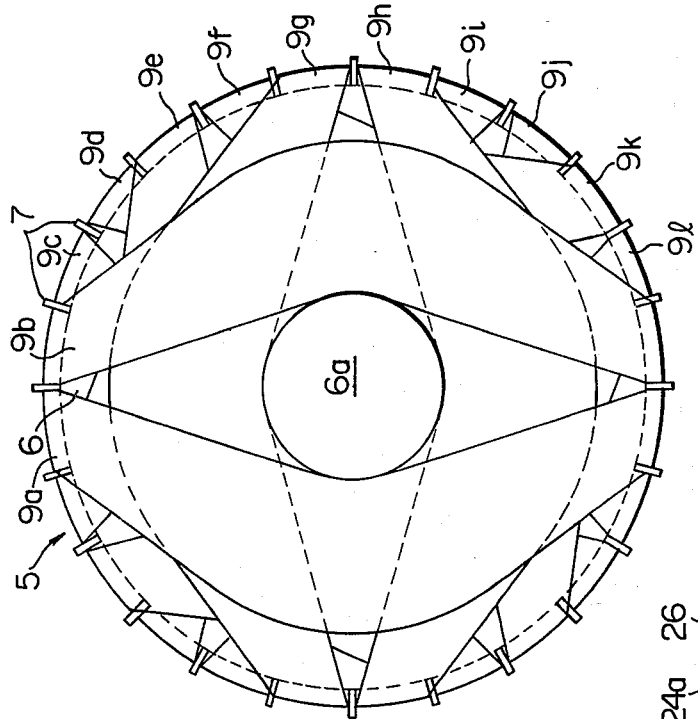
FIG. 1 is a side elevational view of an example of a smooth core armature having coils wound by a coil winding machine of the invention.
Figure 2:
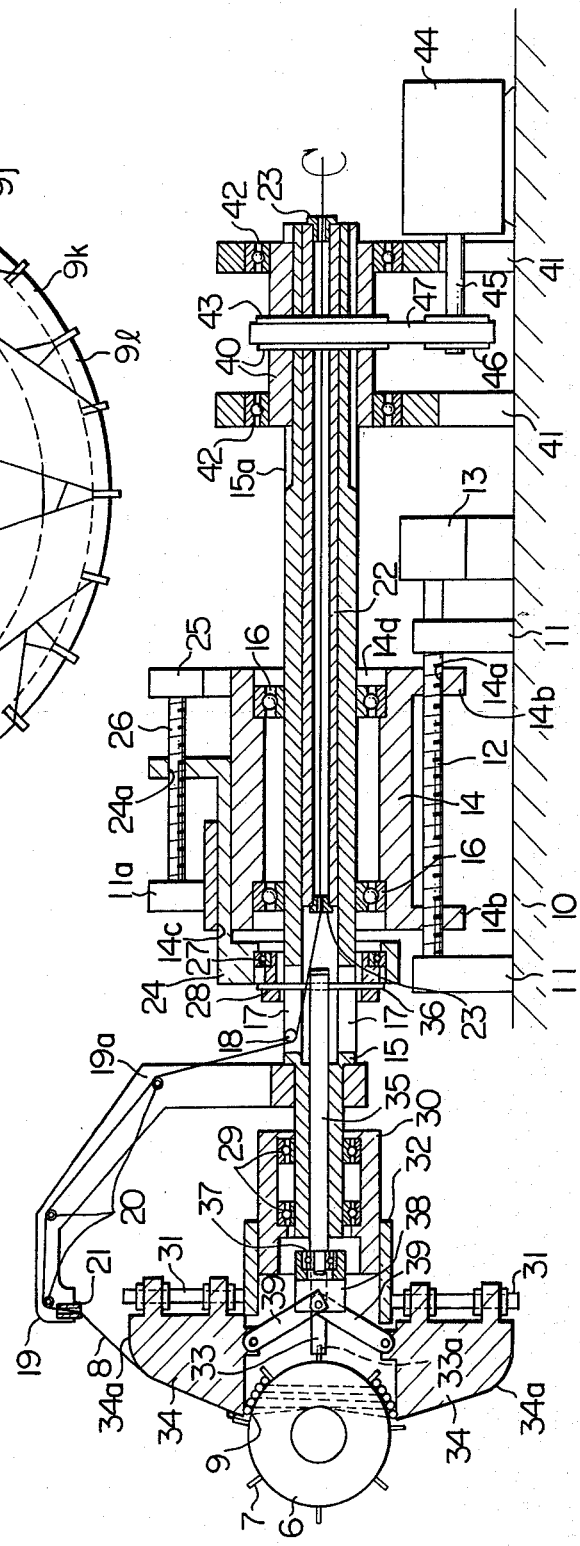
FIG. 2 is a sectional side elevational view of a coil winding machine constructed in accordance with an embodiment of the invention.

The smooth core armature 5 is provided on its both axial ends with bosses or shafts 6a of small diameter projecting from a core 6. At the same time, a plurality of pins 7 are formed on a circle centered at the axis of the core 6 at each axial end thereof. In the embodiment shown in FIG. 1, 24 (twenty four) pins 7 are formed at each axial end of the core 6. The smooth core armature 5 is completed by winding coils 9 on the core 6. In the illustrated embodiment, 12 (twelve) coils 9a-9l are formed on the core.

The coil winding machine of the invention includes winding means, guiding means, driving means and retaining means, each of which will be described in detail hereinunder.

WINDING MEANS

The winding means as a whole are carried by a reciprocally slidable base 10. A pair of supporting members 11 are provided to stand upright from the base 10, at a predetermined distance from each other. A feed screw 12 is rotatably supported between these supporting members 11 and is coupled at its one end to the shaft of a pulse motor 13 (referred to simply as "motor", hereinunder) fixed to the base 10. Therefore, the feed screw 12 is adapted to rotate in one and the other directions as the motor 13 is driven in one and the other directions. Between these supporting members, a guide bar (not shown) is supported to extend in parallel with the feed screw and at a predetermined distance from the latter.

A bearing block 14 is provided in its lower face with projections 14b, each having a threaded bore 14a for screw engagement with the feed screw 12 and a bore (not shown) for slidably receiving the aforementioned guide bar. The bearing block 14 is displaceably mounted between the pair of supporting members 11. A hollow spindle 15 is rotatably received by a through bore 14d of the bearing block 14 through bearings 16.

The main spindle 15 is provided with an elongated slot 17 which extends through the spindle 15 in the radial direction. A roller 18 is rotatably supported in one end of the elongated slot 17.

A flyer 19 fixed to the spindle 15 is provided with a groove 19a which receives rollers 20 for guiding the wire 8. A bush 21 is attached to the end of the aforementioned flyer 19.

A pipe 22 having bushes 23 fixed to its both ends is press-fitted to the spindle 15 from one end of the latter. Also, a splined shaft portion 15a is formed on one end of the main shaft 15. A spline 40 engageable with the splined shaft portion 15a for free axial sliding movement is rotatably supported by a pair of posts 41 projected upward from the base 10, through the medium of bearings 42.

A timing pulley 43 is fixed to the spline 40 while another timing pulley 46 is fixed to one end of the rotor shaft 45 of the motor 44. The power of motor is transmitted from the timing pulley 46 to the timing pulley 43 through a timing belt 47 trained on these pulleys.

As the motor 44 starts to run, the spindle 15 is rotated to cause a revolution of the flyer 19 to conduct the coil winding. Then, as the motor 13 is rotated in synchronism with the operation of the motor 44, the feed screw 12 is rotated to cause a sliding movement of the bearing block 14 which in turn moves the spindle 15 in the axial direction thereof. In this case, since the splined shaft portion 15a of the spindle 15 makes a sliding movement along the spline 40, the spindle 15 can rotate without any obstruction.

GUIDING MEANS

The guiding means for limiting the winding position of the wire 8 is provided at one end of the spindle 15. The housing 30 rotatably carried by one end of the spindle 15 through bearings 29 has plates 32 each of which carries a pair of guide bars 31. Each pair of the guide bars 31 slidably support a wire guide 34. The length of the wire guide 34 is smaller than the length of the core 6, so that the wire guide 34 can move through the clearance between the pins 7 provided at both ends of the core 6. The wire guide 34 has a guide surface adapted to guide the wire 8, paid-off from the flyer 19, toward the winding position on the outer peripheral surface of the core 6.

DRIVING MEANS

The driving means are adapted to drive the wire guide 34 along the guide bars 31 in synchronism with the axial movement of the spindle 15 to cause a movement of the wire guide 34 such that the end of the wire guide 34 moves along a circular path concentric with the axis of core 6. The aforementioned bearing block 14 carries a pulse motor 25 (referred to simply as "motor", hereinafter) and a supporting post 11a. A feed screw 26 is coupled to one end of the shaft of the motor 25 while the other end of the feed screw 26 is rotatably carried by the supporting post 11a. A slider 24 is slidably received by a bore 14c formed in the bearing block 14, for sliding movement in the same direction as the spindle 15. A threaded bore 24a is in screw engagement with the feed screw 26. The slider 24 rotatably carries, at its one end, an annular roller 28 through a bearing 27 concentrically with the spindle 15.

The aforementioned roller 28 has a pin 36 which is slidably received by the elongated slot 17 formed in the spindle 15. A shaft 35 slidably received by the axial bore of the spindle 15 is connected at its one end to the central portion of the pin 36. The other end of the shaft 35 rotatably carries a joint 38 through the medium of a bearing 37. A pair of links 39 are pivotally connected at their one ends to the joint 38, while the other ends of the links 39 are pivotally secured to respective wire guides 34.

In the driving means having the described construction, the slider 24 is moved as the motor 25 is started. The movement of the slider 24 is then transmitted to the joint 38 through the roller 28, pin 37 and the shaft 35. In consequence, the relative position between the wire guides 34 and the joint 38 in the axial direction of the spindle 15 is changed so that the wire gudes 34 are moved along the guide bars 31. It is therefore possible, by a control of the operation of motor 25 in accordance with a predetermined program, to drive the wire guides 34 on a circle concentric with the axis of core 6.

RETAINING MEANS

The retaining means are provided for preventing the wire guides 34 from being rotated around the axis of the spindle 15 when the latter is rotated.

A retainer pin 33 is provided at each side end portion of the housing 30 and supported slidably so as to oppose to the pins 7 provided on the core 6.

The retainer pin 33 is biased by means of a spring (not shown) such that its end projects toward the pin 7. Also, a bore 33a fitting the pin 7 is formed in the retainer pin 33.

In the operation of the retaining means having the described construction, as the retainer pin 33 of the core 6 comes into engagement with the pin 7, the housing 30 assumes such a state that it is retained by the core 6, so that the housing 30 is never rotated even when the aforementioned spindle 15 is rotated. Therefore, the wire guides 34 are prevented from being rotated.

When the spindle 15 is slid in the axial direction in accordance with the progress of the coil winding, the retainer pin 33 is pressed into the housing 30 by compressing the aforementioned spring or projected outward from the housing by the force of the spring. Thus, the pins 7 are always contacted resiliently by the retainer pins 33 and are never disengaged from the latter.

The shafts 6a projecting from both ends of the core 6 are fixed by suitable supporting means which are not shown. In this state, the core 6 is supported such that the axis of the core 6 crosses the axis of the spindle 15 at a right angle and that the outer peripheral surface of the core 6 is held in parallel with the guide surfaces 34a of the wire guides. On the other hand, the wire 8 is inserted from the bush 23 and is extracted through the elongated slot 17 via the pipe 22 and the spindle 15. Thereafter, the wire is guided along the flyer 19 by the action of the rollers 18, 20 and is extracted through the bush 21.

In this state, the base 10 is moved ahead toward the core 6, by suitable moving means which are not shown. In consequence, the bore 33a formed in the end of the retainer pin 33 comes to receive the end of the pin 7 provided on the core 6. The housing 30 is retained in this state by the core 6.

Subsequently, the motors 13 and 25 are started to bring the wire guide 34 to such positions that the ends of the wire guides 34 are stationed at the position marked at "B" in FIG. 3, i.e. at the winding starting positions. More specifically, this winding starting position is located between two pins 7 for limiting the winding region and on a circle concentric with the core 6, the circle having a radius $R_1$ which is greater than the radius R of the core 6 by a size 1 to 1.5 times as large as the diameter d of the wire 8. Namely, the circle on which the winding starting position is located is concentric with the outer peripheral surface of the core 6 and is spaced from that outer peripheral surface by a distance which amounts 1 to 1.5 times as large as the diameter d of the wire.

The wire 8 extracted from the flyer 19 is connected to a commutator (not shown) provided on the shaft 6a of the core 6. The motor 44 is started in this state and the flyer 19 is rotated through the spindle 15 to commence the coil winding.

Concurrently, the motors 13 and 25 started in synchronism with the operation of the motor 44 to slide the spindle 15 in the axial direction thereof and, at the same time, to slide the wire guide 34 in the radial direction of the spindle 15. During this operation, the spindle 15 is slid by a distance corresponding to the sum of diameters of 8 (eight) wires in each rotation of the flyer 19. Meanwhile, the wire guide 34 is controlled such that its end moves along a circular path having the radius $R_1$.

In this coil winding operation, the wire 8 is pulled into the gap between the outer peripheral surface of the core 6 and the wire guide 34 and is wound following up the preceding turn of the coil 9 due to the tension applied to the wire 8 caused by the rotation of the flyer 19, even when the wire guide 34 is moved ahead of the winding position for winding the wire 8 as shown in FIG. 3.

As the wire 8 is wound around the core 6 from the starting position B to the terminating position D of the first layer of the coil, the motor 13 is temporarily stopped and the slider 24 is moved ahead solely. Therefore, the wire guide 34 moves from the terminating position D of the first layer to the starting position E for the second layer. The coil winding is continued even during this movement of the wire guide 34.

As the wire guide 34 reaches the position E, the motors 13 and 25 start to operate in reverse directions, so that the wire guide 34 is retracted (by the above-noted shifting of links 39 by shaft 35 which is coupled to slider 24 by pin 36 and bearing 27); and toward a position F along a circle having a radius $R_2$ which is greater than the radius $R_1$ by a size corresponding to the diameter of the wire, thereby to effect the winding to form the second layer of the coil. After the completion of winding of a predetermined number of turns a required length of the wire 8 is extracted from the flyer 19 and suitably cut to make the end of the coil cling about the commutator. Subsequently, the base 10 is retracted to disengage the retainer pin 33 and the pin 7, and the core 6 is rotated by a predetermined angle to effect the winding of the next coil.

In the smooth core armature having coils wound by the coil winding machine of the invention, the end coil portions on the end surfaces of the core 6 are not arrayed. At the same time, the position of the wire constituting the second layer is determined by the first layer of the coil.

What is claimed is:

1. A coil winding device for winding a coil around a smooth core armature comprising:
   a bearing arranged with its axis prependicular to the axis of an iron core having a cylindrical peripheral surface located in a predetermined position, said bearing being mounted for sliding movement in an axial direction;
   first drive means for axially displacing said bearing;
   a spindle having a shaft rotatably journaled by said bearing, mounted to be axially slideable in conjunction with said sliding movement of the bearing and formed with a slot in an axial portion of its shaft;
   a flyer secured to said spindle for winding a wire, extending through the axial portion of the spindle shaft and pulled out of said slot, around the iron core on said cylindrical surface; and
   guide means supported at one end of the spindle for rotation relative to the spindle and for guiding the wire to be wound by said flyer toward the iron core, so as to wind the wire around the iron core;
   wherein the improvement resides in that said guide means is constituted by a housing rotatably supported by the spindle, and a pair of wire guides supported by the housing, with the axis of the spindle being interposed between the wire guides, for sliding movement in a direction perpendicular to a plane including the axis of the spindle and the axis of the iron core; that moving means is provided, which comprises a slider supported by the bearing for sliding movement in a direction parallel to the axis of the spindle, second drive means, supported by the bearing for moving the slider in sliding movement, a pin rotatably supported by the slider and slidably extending through the slot in the spindle, a shaft slidably inserted in the axial portion of the spindle and having one end at which it is connected to the pin, a joint rotatably supported at the other end of the shaft, and a pair of links connecting the joint to each of said wire guides, and that the slider is operable to be moved by said second drive means in sliding movement in synchronism with sliding movement of the spindle produced by said first drive means, so as to thereby move the wire guides along the cylindrical surface of the iron core.

2. A coil winding device for winding a coil around a smooth core armature comprising:
   a bearing arranged with its axis perpendicular to the axis of an iron core having a cylindrical peripheral surface located in a predetermined position, which bearing being mounted for moving in sliding movement in the axial direction;
   first driving means for axially displacing said bearing;
   a spindle having a shaft rotatably journaled by said bearing, mounted to be axially slidable to conjunction with said sliding movement of the bearing and formed with a slot in a predetermined position in its shaft portion;
   a flyer secured to said spindle for winding a wire extending through the axial portion of the spindle and pulled out of said slot around the iron core; and
   guide means supported at one end of the spindle for rotation relative to the spindle and for guiding the wire to be wound by said flyer toward the iron core, so as to wind the wire around the iron core;
   wherein the improvement resides in that said guide means is constituted by a housing and a pair of wire guides, said housing comprising a pair of retainer pin means, rotatably supported at one end to the spindle in a manner to be juxtaposed against the cylindrical surface of the iron core, and formed at an opposite end thereof with openings juxtaposed against said pins, for engaging a plurality of pins attached to about ends of the cylindrical surface for forming the coil, said retaining pin means being biased to project toward the pins for sliding movement in a direction parallel to the axis of the spindle, and two pairs of guide bars being located perpendicular to a plane including the axes of the spindle and the iron core and projecting from a plane parallel to said plane, and said pair of wire guides each being slidably supported by one pair of said two pairs of guide bars and formed on a side surface thereof that is directed toward the iron core with a guide surface for guiding the wire delivered by the flyer toward the cylindrical surface of said iron core; and that moving means for moving the wire guides in sliding movement in synchronism with the sliding movement of the spindle is constituted by a second driving means comprising a feed screw rotatably supported by the bearing in such a manner that its axis is parallel to the axis of the bearing, and a drive source for the feed screw, a slider slidably supported by the bearing in such a manner that it is slidable in a direction parallel to the axis of the bearing, said slider being in threadable engagement with said feed screw at one end and supporting at the other end for rotation an annular roller slidably mounted on the spindle, a pin slidably received in the slot formed in the spindle and secured at opposite ends to the roller, a shaft connected at one end to said pin and slidably fitted to the axis of the spindle and projecting at the other end into the housing, a joint rotatably supported by the projecting end of the shaft, and a pair of links connected at one end to the joint for rotation and at the other end to the wires guides for rotation.

3. A coil winding device for winding a coil around a smooth core armature comprising:
   (A) a spindle having a shaft and a flyer secured thereto for winding a wire about an iron armature core on a cylindrical peripheral surface of the iron armature core;
   (B) mounting means for mounting said spindle in a rotatably and axially displaceable manner;
   (C) spindle drive means for rotating the shaft and flyer;
   (D) wire guide means for guiding the wire to be wound about said armature core by said flyer toward the armature core, said wire guide means comprising a housing rotatably journaled to an end of said spindle, a pair of wire guides, means mounting said wire guides to said housing for displacement radially of said spindle toward and away from each other, adjusting means for radially adjusting the position of said wire guides, and retaining means for engaging an armature core located at least partially between said wire guides with its longitudinal axis disposed normal to said spindle and directions in which the wire guides are displaceable for preventing rotation of the wire guides relative to the armature core; and
   (E) synchronized drive means for radially and axially displacing said wire guides relative to the cylindrical surface of said armature while said wire is wound about said armature core by rotation of said shaft and flyer, whereby circumferentially adjacent windings are produceable on said cylindrical surface of the armature core, said synchronized drive means comprising a first drive means for axially displacing said spindle and a second drive means connected to said adjusting means for radially displacing the wire guides.

4. A coil winding device according to claim 3, wherein said retaining means comprises a pair of retaining pins carried by said adjusting means, each of said retaining pins being provided with a hole for mating with a pin of a respective ring of radially projecting pins arranged circumferentially about opposite ends of the armature core.

* * * * *